United States Patent [19]
Zander et al.

[11] Patent Number: 5,697,570
[45] Date of Patent: Dec. 16, 1997

[54] FOLDABLE FILM WINDING CRANK FOR CAMERA

[75] Inventors: Dennis Roland Zander, Penfield; Timothy Allan Peter, Sr., Hilton, both of N.Y.

[73] Assignee: Eastman Kodak Company, Rochester, N.Y.

[21] Appl. No.: 616,611

[22] Filed: Mar. 15, 1996

[51] Int. Cl.$^6$ .................................................. G03B 1/04
[52] U.S. Cl. ..................... 242/350; 242/395.1; 396/411
[58] Field of Search ........................ 242/350, 395.1; 396/411, 413, 387; 74/545, 546, 547

[56] References Cited

U.S. PATENT DOCUMENTS

| | | | |
|---|---|---|---|
| 2,357,328 | 9/1944 | Harris | 242/350 X |
| 2,455,819 | 12/1948 | Smith | 242/395.1 |
| 2,574,689 | 11/1951 | Christ | 74/546 |
| 2,620,682 | 12/1952 | Perrot | 74/547 |
| 2,912,181 | 11/1959 | Suzukawa | 242/350 |
| 3,005,599 | 10/1961 | Padelt | 242/350 |
| 3,044,732 | 7/1962 | Simonds | 242/395.1 |
| 3,097,809 | 7/1963 | Gunther | 242/350 |
| 3,313,498 | 4/1967 | Wasson | 242/395.1 |
| 3,412,626 | 11/1968 | Zeigler et al. | 74/547 X |

FOREIGN PATENT DOCUMENTS 57-51377   11/1982   Japan ................ G03B 17/00

*Primary Examiner*—Daniel P. Stodola
*Assistant Examiner*—William A. Rivera
*Attorney, Agent, or Firm*—Roger A. Fields

[57] ABSTRACT

A foldable film winding crank for a camera comprising a rotary base, and a two-part handle having a first handle part pivotably connected to the base and a second handle part pivotably connected to the first handle part to permit the two-part handle to be folded lengthwise into a cavity in the base for storage and to be unfolded lengthwise from the cavity to be manually grasped in order to rotate the base for film winding, is characterized in that a pivotable connection between the first handle part and the base and a pivotable connection between the second handle part and the first handle part are located at respective sides of an axis of rotation of the base to initially allow the second handle part to be foldingly pivoted in one direction to the first handle part and then allow the first handle part to be foldingly pivoted together with the second handle part in an opposite direction into the cavity and, conversely, to initially allow the second handle part to be unfoldingly pivoted from the first handle part in one direction and then allow the second handle part to be unfoldingly pivoted from the cavity in an opposite direction. This allows the cavity to be made relatively shallow.

1 Claim, 4 Drawing Sheets

FOLDABLE FILM WINDING CRANK FOR CAMERA

FIELD OF THE INVENTION

The invention relates generally to the field of photography, and in particular to a foldable film winding crank for a camera.

BACKGROUND OF THE INVENTION

Cameras for use today with lighttight 35 mm film cassettes often include a foldable film winding crank. The film winding crank is normally folded for storage, but can be unfolded to be manually rotated in order to wind an exposed filmstrip into the cassette.

The prior art Kodak "Cameo Focus Free" camera has a foldable film winding crank which comprises a rotary base, and a two-part handle having a first handle part pivotably connected to the base and a second handle part pivotably connected to the first handle part to permit the two-part handle to be folded lengthwise into a cavity in the base for storage and to be unfolded lengthwise from the cavity to be manually grasped in order to rotate the base for film winding. The pivotal connection between the first handle part and the base and the pivotal connection between the second handle part and the first handle part are positioned at the same side of the axis of rotation of the base when the two-part handle extends lengthwise from the cavity for use. This initially allows the second handle part to be foldingly pivoted in a one direction over the first handle part and then allows the first handle part together with the second handle part to be foldingly pivoted in the same direction into the cavity. Consequently, the second handle part comes to rest beneath the first handle part in the cavity, and the pivotal connection between the second handle part and the first handle part is displaced from the side of the axis of rotation of the base it was at when the two-part handle was unfolded to an opposite side of the axis. The pivotal connection between the first handle part and the base is not displaced and, therefore, remains in the same location. This necessitates that the cavity be made relatively deep.

SUMMARY OF THE INVENTION

A foldable film winding crank for a camera comprising a rotary base, and a two-part handle having a first handle part pivotably connected to the base and a second handle part pivotably connected to the first handle part to permit the two-part handle to be folded lengthwise into a cavity in the base for storage and to be unfolded lengthwise from the cavity to be manually grasped in order to rotate the base for film winding, is characterized in that:

a pivotable connection between the first handle part and the base and a pivotable connection between the second handle part and the first handle part are located at respective sides of an axis of rotation of the base to initially allow the second handle part to be foldingly pivoted in one direction to the first handle part and then allow the first handle part to be foldingly pivoted together with the second handle part in an opposite direction into the cavity and, conversely, to initially allow the second handle part to be unfoldingly pivoted from the first handle part in one direction and then allow the second handle part to be unfoldingly pivoted from the cavity in an opposite direction.

This allows the cavity to be made relatively shallow as compared to the cavity for the foldable film winding crank of the prior art Kodak "Cameo Focus Free" camera.

DETAILED DESCRIPTION OF THE INVENTION

The invention is disclosed as being embodied preferably in a camera to be used with a lighttight 35 mm film cassette. Because the features of this type of camera are generally known, the description which follows is directed in particular only to those elements forming part of or cooperating directly with the disclosed embodiment. It is to be understood, however, that other elements may take various forms known to a person of ordinary skill in the art.

Figure 1:
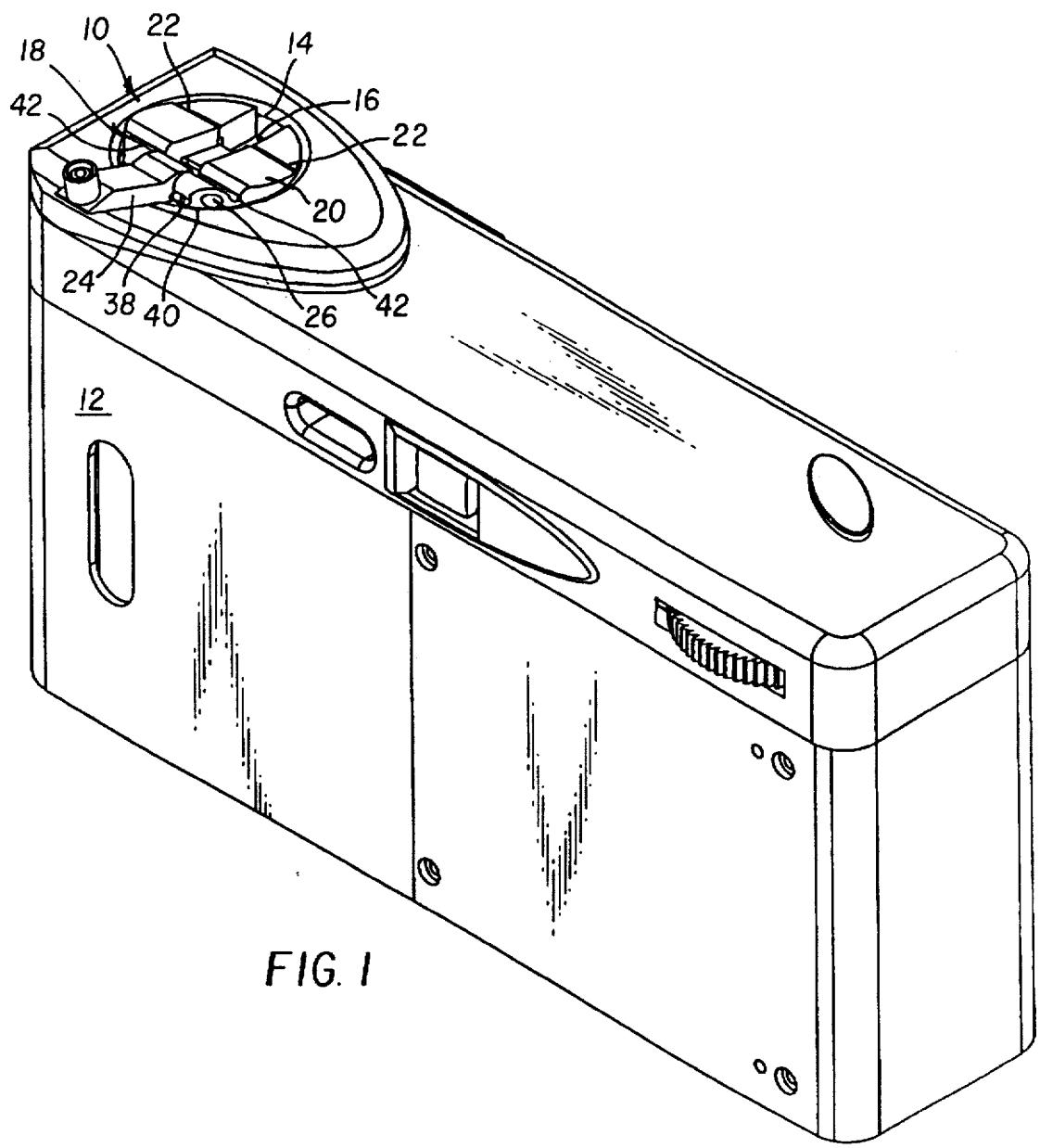
FIG. 1 is a top rear perspective view of a camera including an unfolded two-part handle of a foldable film winding crank, according to a preferred embodiment of the invention.
Figure 2:
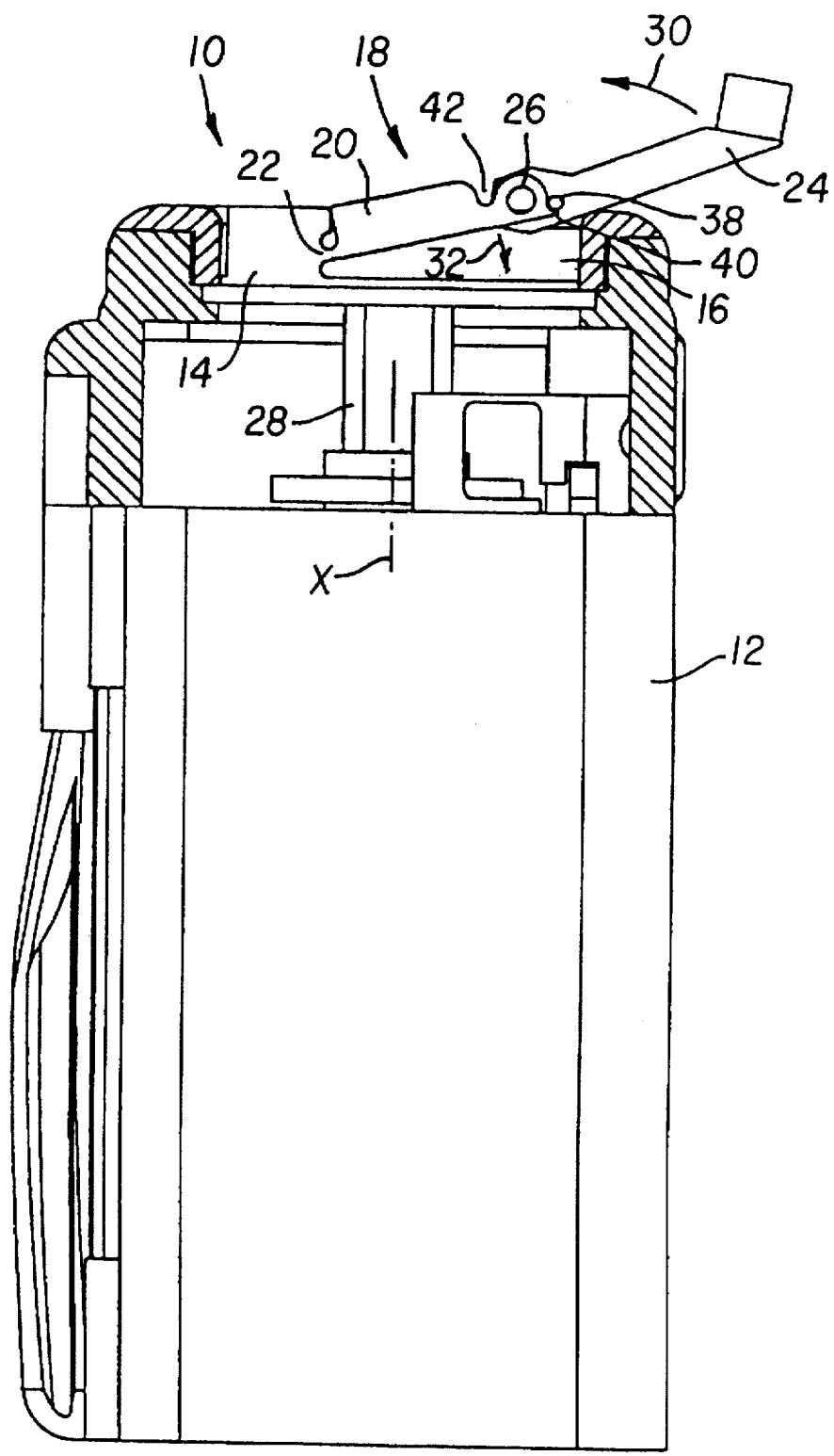
FIG. 2 is a side elevation view of the camera partially in section showing the two-part handle of the foldable film winding crank unfolded as in FIG. 1.
Figure 3:
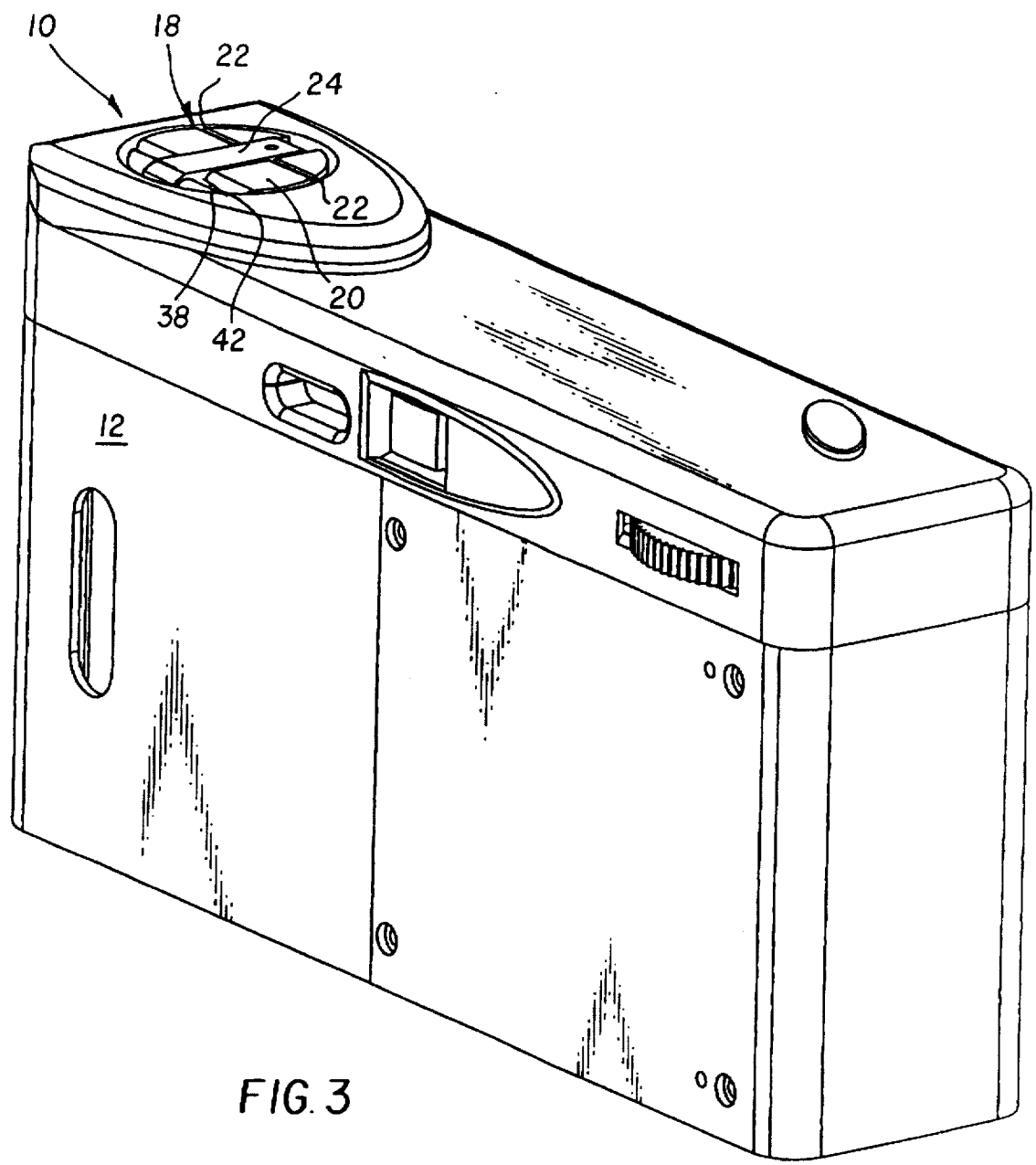
FIG. 3 is a top rear perspective view of the camera showing the two-part handle of the foldable film winding crank folded.
Figure 4:
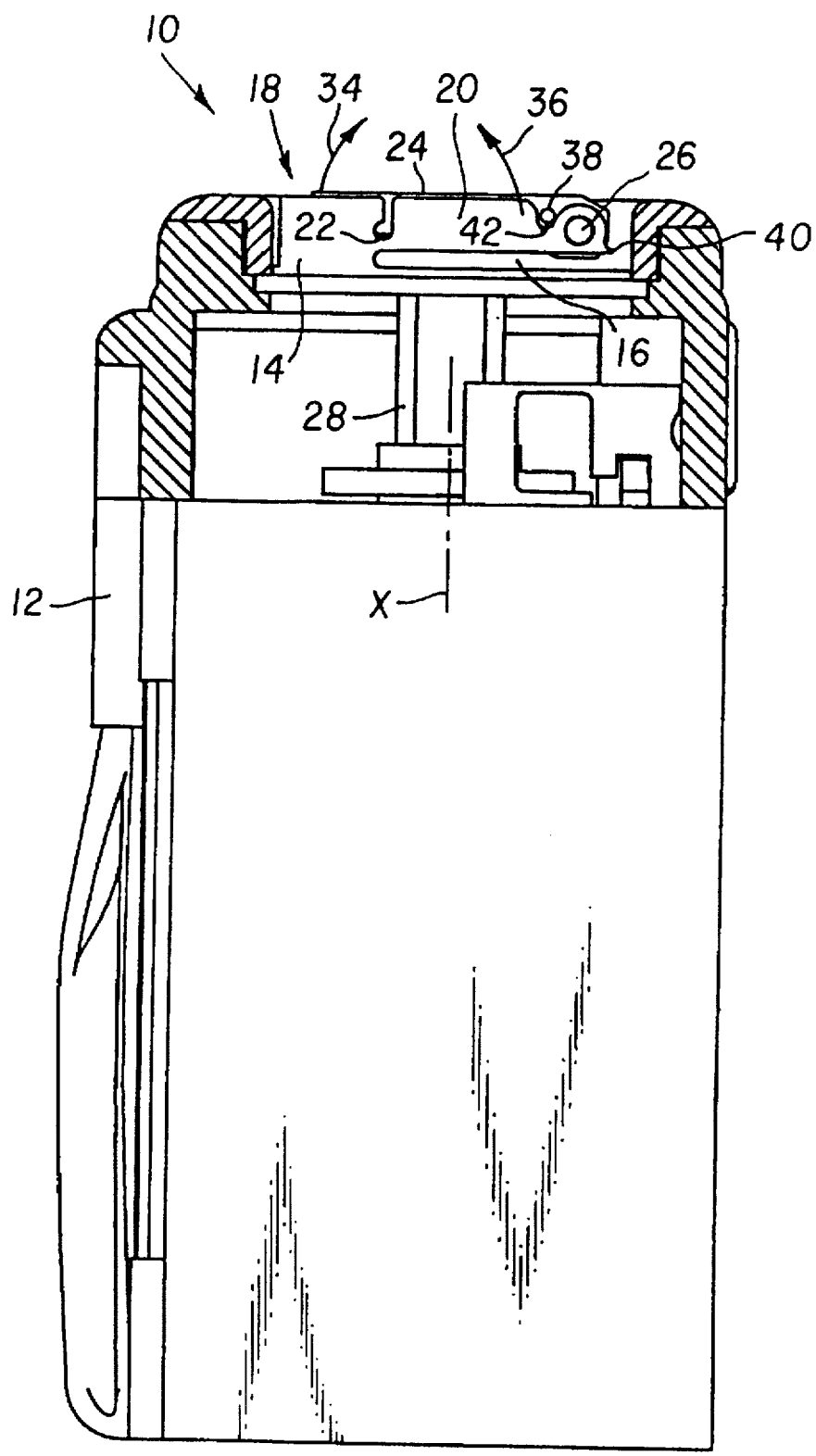
FIG. 4 is a side elevation view of the camera partially in section showing the two-part handle of the foldable film winding crank folded as in FIG. 3.

Referring now to the drawings, FIGS. 1–4 show a foldable film winding crank 10 included in a camera 12 to be used with the lighttight 35 mm film cassette. The crank 10 comprises a rotary split base 14 having a groove-like cavity 16, and a two-part handle 18 having a first or split handle part 20 pivotably connected to the base via a pair of aligned living hinge connections 22 and a second or non-split handle part 24 pivotably connected to the first handle part via a pair of aligned pivot pin connections 26 to permit the two-part handle to be folded lengthwise into the cavity in the base for storage, as shown in FIGS. 3 and 4, and to be unfolded lengthwise from the cavity, as shown in FIGS. 1 and 2, to be manually grasped in order to rotate the base for film winding. The base 14 has a coaxial integral post 28 that is rotatably coupled with a forked driver, not shown, for engaging a film spool inside the lighttight film cassette to rotate the spool to wind an exposed filmstrip into the cassette.

The pair of living hinge connections 22 between the first or split handle part 20 and the base 14 and the pair of pivot pin connections 26 between the second or non-split handle part 24 and the first handle part are located at respective sides of an axis of rotation X of the base to initially allow the second handle part to be foldingly pivoted in one direction 30, indicated in FIG. 2, to the first handle part and then allow the first handle part to be foldingly pivoted together with the second handle part in an opposite direction 32, indicated in FIG. 2, into the cavity 16 and, conversely, to initially allow the second handle part to be unfoldingly pivoted from the first handle part in one direction 34, indicated in FIG. 4, and then allow the second handle part to be unfoldingly pivoted from the cavity in an opposite direction 36, indicated in FIG. 4.

A pair of aligned stop pins 38 project from the second or non-split handle part 24 to be engaged by respective stop projections 40 on the first or split handle part 20 when the second handle part is unfoldingly pivoted in the direction 34 from the first handle part and to be positioned in respective stop notches 42 in the first handle part when the second handle part is foldingly pivoted in the direction 30 to the first handle part.

The invention has been described with reference to a preferred embodiment. However, it will be appreciated that variations and modifications can be effected by a person of ordinary skill in the art without departing from the scope of the invention.

PARTS LIST 10. foldable film winding crank
12. camera
14. rotary split base
16. groove-like cavity
18. two-part handle
20. first or split handle part
22. pair of living hinges
24. second or non-split handle part
26. pivot pin connections
28. post
X. axis
30. direction
32. direction
34. direction
36. direction
38. pair of stop pins
40. pair of stop projections
42. pair of stop notches

We claim:

1. A foldable film winding crank for a camera comprising a rotary base, and a two-part handle having a first handle part pivotably connected to said base and a second handle part pivotably connected to said first handle part to permit said two-part handle to be folded lengthwise into a cavity (16) in the base for storage and to be unfolded lengthwise from said cavity to be manually grasped in order to rotate the base for film winding, is characterized in that:

a first pivotable connection between said first handle part and said base and a second pivotable connection between said second handle part and the first handle part are located at respective sides of an axis of rotation of the base to initially allow the second handle part to be foldingly pivoted in one direction at the second pivotable connection to the first handle part and then allow the first handle part to be foldingly pivoted together with the second handle part in an opposite direction at the first pivotable connection into said cavity and, conversely, to initially allow the second handle part to be unfoldingly pivoted from the first handle part in one direction at the second pivotable connection and then allow the first handle part to be unfoldingly pivoted from the cavity in an opposite direction at the first pivotable connection.

* * * * *